(12) United States Patent
Thid et al.

(10) Patent No.: US 12,052,117 B2
(45) Date of Patent: Jul. 30, 2024

(54) CONFIGURING FRONTHAUL LINK

(71) Applicant: Telefonaktiebolaget LM Ericsson (publ), Stockholm (SE)

(72) Inventors: Rikard Thid, Tyresö (SE); Anders Hagstrom, Solna (SE); Zabihullah Bayat, Vallentuna (SE); Patrik Nordensky, Farsta (SE); Thomas Nilsson, Västerås (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 17/919,938

(22) PCT Filed: Apr. 22, 2020

(86) PCT No.: PCT/SE2020/050406
§ 371 (c)(1),
(2) Date: Oct. 19, 2022

(87) PCT Pub. No.: WO2021/215975
PCT Pub. Date: Oct. 28, 2021

(65) Prior Publication Data
US 2023/0155860 A1    May 18, 2023

(51) Int. Cl.
*H04L 47/20* (2022.01)
*H04L 12/40* (2006.01)
*H04L 12/46* (2006.01)

(52) U.S. Cl.
CPC ...... *H04L 12/4604* (2013.01); *H04L 12/4013* (2013.01)

(58) Field of Classification Search
CPC ............. H04L 12/4604; H04L 12/4013; H04L 1/0003; H04W 28/0268; H04W 24/00
See application file for complete search history.

(56) References Cited

U.S. PATENT DOCUMENTS 10,355,895 B2    7/2019  Barbieri et al.
11,622,294 B2 *  4/2023  Mackenzie ........... H04W 24/00
                                                    370/235

(Continued)

OTHER PUBLICATIONS

International Search Report and Written Opinion dated Jun. 25, 2020 in International Application No. PCT/SE2020/050406 (10 pages).

*Primary Examiner* — Abdelnabi O Musa
(74) *Attorney, Agent, or Firm* — Rothwell, Figg, Ernst & Manbeck, P.C.

(57) ABSTRACT

The present disclosure relates to a method of a first radio equipment device (10) of configuring a fronthaul communication link (30) established with a second radio equipment device (20), and a first radio equipment device (10) performing the method. In an aspect, a method of a first radio equipment device (10) of configuring a fronthaul communication link (30) established with a second radio equipment device (20) is provided. The method comprises configuring (S101a) the first radio equipment device (10) to receive data over the fronthaul communication link (30) at a selected bitrate with a selected communication protocol type, detecting (S103) if bitrate of, and communication protocol type used for, data received over the fronthaul communication link (30) match the selected bitrate and the selected communication protocol type for which the first radio equipment device (10) is configured to receive data, wherein at least one of the selected bitrate and the selected communication protocol type for which the first radio equipment device (10) is configured (S101b-S101e) to receive data is adjusted (S101b-S101e) until a match is detected, and selecting (S105) the bitrate and communication protocol type for which there is a match as the bitrate and communication protocol type with which data is communicated over the fronthaul communication link (30).

18 Claims, 4 Drawing Sheets

(56) References Cited

U.S. PATENT DOCUMENTS

| | | | | |
|---|---|---|---|---|
| 2017/0244648 A1* | 8/2017 | Tse | .......................... | H04L 47/28 |
| 2018/0034669 A1* | 2/2018 | Barbieri | .............. | H04B 1/1661 |
| 2019/0254047 A1* | 8/2019 | Ahmed | ............. | H04W 28/0231 |
| 2019/0281501 A1* | 9/2019 | Berg | ..................... | H04L 1/0002 |
| 2020/0028639 A1* | 1/2020 | Lindqvist | ................ | H04L 5/006 |
| 2020/0252980 A1* | 8/2020 | Anand | .................. | H04W 28/22 |
| 2020/0313692 A1* | 10/2020 | Berg | ................... | H03M 7/6041 |
| 2021/0051494 A1* | 2/2021 | Anand | .................. | H04L 41/069 |
| 2022/0312257 A1* | 9/2022 | Mackenzie | ............. | H04L 1/003 |

* cited by examiner

CONFIGURING FRONTHAUL LINK

CROSS REFERENCE TO RELATED APPLICATIONS

This application is a 35 U.S.C. § 371 National Stage of International Patent Application No. PCT/SE2020/050406, filed Apr. 22, 2020.

TECHNICAL FIELD

The present disclosure relates to a method of a first radio equipment device of configuring a fronthaul communication link established with a second radio equipment device, and a first radio equipment device performing the method.

BACKGROUND

Fronthaul networks connect various devices such as baseband units, switches, converters with radio units. A fronthaul link is a point-to-point connection between a baseband unit and a radio unit, between two radio units, between a converter and a radio unit or any other combination. This equipment may support a multitude of bitrates (1.22G, 2.45G, 9.8G. 10.1G, 10G, 24.3G, 25G etc.), protocols such as a Common Public Radio Interface (CPRI), Ethernet, etc., and different Forward Error Correction (FEC) methods, for instance no FEC, Reed Solomon (RS) and KR-FEC. Both ends of a link must use the same bitrate, protocol and FEC standard simultaneously to become operational.

The CPRI protocol specifies how bitrates are shifted with a 1-second cycle on master ports and a 4-second cycle on slave ports. Master and Slave will eventually use the common bitrate and then connection can be established. However, there is not guarantee that a preferred bitrate is used in that initial connection. And the CPRI protocol standard does not provide a means to guarantee that the connection has a preferred bitrate.

SUMMARY

One objective is to solve, or at least mitigate, this problem in the art and thus to provide an improved method of a first radio equipment device of configuring a fronthaul communication link established with a second radio equipment device.

This objective is attained in a first aspect of the invention by a method of a first radio equipment device of configuring a fronthaul communication link established with a second radio equipment device. The method comprises configuring the first radio equipment device to receive data over the fronthaul communication link at a selected bitrate with a selected communication protocol type, detecting if bitrate of, and communication protocol type used for, data received over the fronthaul communication link match the selected bitrate and the selected communication protocol type for which the first radio equipment device is configured to receive data, wherein at least one of the selected bitrate and the selected communication protocol type for which the first radio equipment device is configured to receive data is adjusted until a match is detected, and selecting the bitrate and communication protocol type for which there is a match as the bitrate and communication protocol type with which data is communicated over the fronthaul communication link.

This objective is attained in a second aspect of the invention by a first radio equipment device configured to cause configuring of a fronthaul communication link established with a second radio equipment device. The first radio equipment device comprises a processing unit and a memory, which memory contains instructions executable by the processing unit, whereby the first radio equipment device is operative to configure the first radio equipment device to receive data over the fronthaul communication link at a selected bitrate with a selected communication protocol type, to detect if bitrate of, and communication protocol type used for, data received over the fronthaul communication link match the selected bitrate and the selected communication protocol type for which the first radio equipment device is configured to receive data, wherein at least one of the selected bitrate and the selected communication protocol type for which the first radio equipment device is configured to receive data is adjusted until a match is detected, and to select the bitrate and communication protocol type for which there is a match as the bitrate and communication protocol type with which data is communicated over the fronthaul communication link.

Hence in a first step, the first radio equipment (RE) is configured to be capable of receiving data over the fronthaul communication link at a selected bitrate, for instance 10 Gbps, and with a selected communication protocol type, such as Ethernet.

At the other end of the fronthaul communication link, the second RE will correspondingly be configured to receive data at a selected bitrate and with a selected communication protocol type. In this example, the second RE is configured to be capable of receiving the data at a bitrate of 25 Gbps over the fronthaul communication link using CPRI.

Now, it is not possible for the first RE and the second RE to exchange data over the link utilizing different data bitrates and/or different communication protocols. If so, it is not possible for one device to correctly interpret the data transmitted by the other. In other words, data received at other bitrates and/or with other communication protocols than what any one of the first RE and the second RE has been configured to receive will not be decoded correctly.

If at least one of the REs transmit data at the bitrate and with the protocol it is configured to received data over the link, it is possible to eventually find a match with the bitrate and protocol used by the other device, for instance by performing adjustments of the bitrate and/or protocol type at certain intervals until a matching combination of bitrate and protocol type is detected wherein the matching combination is selected for communication of data over the fronthaul link at both REs.

When a match is found, data can advantageously be exchanged over the fronthaul link using the matching combination of bitrate and protocol type and the fronthaul link has thus been successfully configured.

In an embodiment, the configuring of the first RE further comprises selecting type of Forward Error Correction (FEC) applied when receiving data over the fronthaul communication link, wherein the type of FEC applied is adjusted until the adjusted FEC matches the FEC applied to the data being received over the fronthaul communication link.

In an embodiment, when a match is found and data successfully may be exchanged over the adequately configured fronthaul link, the first RE transmits information over the fronthaul communication link indicating one or more combinations of bitrate and communication protocol type (and possibly FEC type) at which the first RE is capable of receiving and transmitting data over the fronthaul communication link.

By having the second RE sending the corresponding information, it is advantageously possible to select a preferred matching combination in case there are multiple matching combinations. For instance, the first RE may evaluate the matching combinations and select a combination of matching bitrate and protocol type which results in the highest bitrate for data being communicated over the fronthaul link.

A number of criteria may be evaluated for a preferred selection, such as 1) a highest matching bitrate, 2) a highest matching bitrate for a particular protocol, 3) a highest bitrate for a particular matching FEC, or just 4) a preferred protocol type regardless of bitrate, etc. Any matching combination is possible, even though it is likely in practice that a highest possible bitrate is used for communication over the fronthaul link.

In an embodiment, information indicating the selected matching combination is exchanged over the fronthaul communication link.

In an embodiment, protocol stack is established for communication over the fronthaul communication link.

In an embodiment, in case the second RE is not an equipment supporting negotiation of a preferred matching combination of bitrate and protocol type as has been described hereinabove, the first RE may start a timer upon transmitting the information to the second RE indicating its capabilities in terms of bitrate and protocol type (and possibly FEC type). If the second RE does not reply before the timer expires, the first RE will maintain the (only) matching combination which already has been selected.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

Aspects and embodiments are now described, by way of example, with reference to the accompanying drawings, in which.

DETAILED DESCRIPTION

The aspects of the present disclosure will now be described more fully hereinafter with reference to the accompanying drawings, in which certain embodiments of the invention are shown.

These aspects may, however, be embodied in many different forms and should not be construed as limiting; rather, these embodiments are provided by way of example so that this disclosure will be thorough and complete, and to fully convey the scope of all aspects of invention to those skilled in the art. Like numbers refer to like elements throughout the description.

Figure 1:
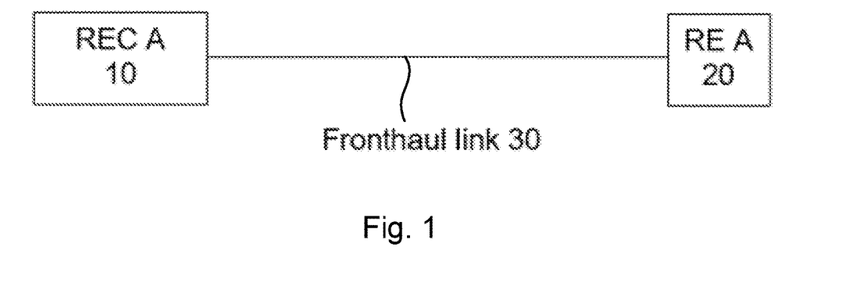
FIG. 1 illustrates two radio equipment devices establishing communication over a fronthaul link according to an embodiment.

FIG. 1 illustrates two radio equipment devices establishing communication over a fronthaul link according to an embodiment.

A first radio equipment device is referred to as Radio Equipment Control (REC) A 10, being for instance a baseband unit (BBU), while a second radio equipment device is referred to as Radio Equipment (RE) A 20, being for instance a radio unit in the form of e.g. a remote radio head (RRH). REC and RE are terms used in the CPRI standard and are exemplifying only; embodiments herein are applicable to other standards as well. The REC A 10 and RE A 20 connects over the fronthaul link 30, being for instance a fibre optical link or electric cable connecting the two devices. The REC A 10 is commonly referred to as a master, while the RE A 20 is referred to as a slave.

Figure 2:
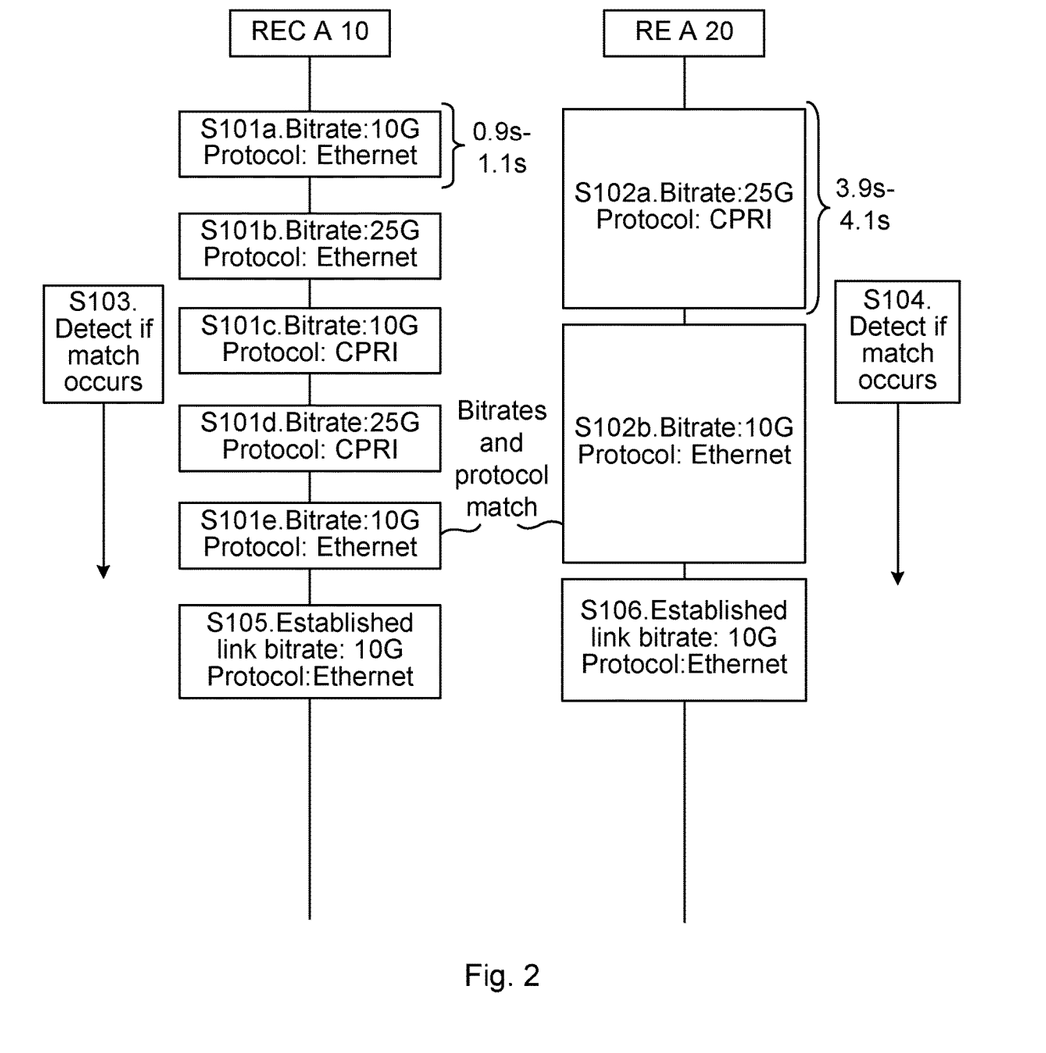
FIG. 2 shows a signalling diagram illustrating a method of configuring the fronthaul communication link connecting the two radio equipment devices of FIG. 1 according to an embodiment.

FIG. 2 shows a signalling diagram illustrating a method of configuring the fronthaul communication link 30 connecting the REC A 10 and the RE A 20 according to an embodiment.

In step S101a, the REC A 10 is configured to be capable of receiving data over the fronthaul communication link 30 at a selected bitrate, for instance 10 Gbps, and with a selected communication protocol type, such as Ethernet.

At the other end of the fronthaul communication link 30, the RE A 20 will correspondingly be configured to receive data in step S102a at a selected bitrate and with a selected communication protocol type. In this example, the RE A 20 is configured to be capable of receiving the data at a bitrate of 25 Gbps over the fronthaul communication link 30 using CPRI.

Now, as is understood, it is not possible for the REC A 10 and the RE A 20 to exchange data over the link 30 utilizing different data bitrates and/or different communication protocols. If so, it is not possible for one device to correctly interpret the data transmitted by the other. In other words, data received at other bitrates and/or with other communication protocols than what any one of the REC A 10 and the RE A 20 has been configured to receive will not be decoded correctly.

Further, upon the configuration being performed in steps S101a-S101e for the REC A 10 and in steps S102a-S102b for the RE A 20, at least one of the devices will transmit data over the fronthaul link 30 at the selected bitrate and protocol type.

In practice, both the REC A 10 and the RE A 20 will transmit data over the link 30 in case Ethernet is applied, while upon applying CRPI only the master device REC A 10 will transmit data initially until the slave device RE A 20 successfully has been able to decode the CPRI protocol at the selected bitrate, wherein the slave device RE A 20 also may start transmitting data over the link 30.

The REC A 10 will thus transmit data in step S101*a* over the fronthaul communication link 30 at the selected bitrate of 10 Gbps using Ethernet, while the RE A 20 is configured to be able to receive data in step S102*a* over the fronthaul communication link 30 at the selected bitrate of 25 Gbps using CPRI. As mentioned, since the RE A 20 currently applies the CPRI protocol, the RE A 20 will yet not transmit data over the link 30.

The REC A 10 will continuously detect whether or not the RE A 20 transmits data over the link at the same selected bitrate and with the same selected protocol for which the REC A has been configured to receive data over the link 30, and vice versa, as illustrated with steps S103 and S104. If so, the bitrate and the protocol will match, and the two devices 10, 20 may as a result successfully exchange data over the adequately configured link 30.

However, in this particular exemplifying embodiment, after steps S101*a* and S102*a* have been performed, there is no match, and the REC A 10 will adjust the bitrate and/or the protocol type for which it is configured to receive data. In this example, the REC A 10 is in step S101*b* configured to receive Ethernet data at 25 Gbps, and as a result only the bitrate of the data transmitted over the fronthaul link 30 is adjusted to 25 Gbps in step S101*b* while still transmitting the data over the link 30 in Ethernet format.

It should be noted that at this stage, it may be envisaged that the RE A 20 also adjusts the bitrate/protocol with which it is capable of receiving data, and thus also the bitrate of the data (and/or protocol type) transmitted over the link 30, even though that is not performed in this particular example.

It is noted that adjustments of the bitrates may be undertaken every 0.9-1.1 s as specified in the CPRI specification However, neither the REC A 10 nor the RE A 20 detects a match after the adjustment performed in step S101*b*, and the REC A 10 adjusts both the bitrate and the protocol type for the data it is configured to receive in step S101*c* to 10 Gbps and CPRI, while the RE A 20 adjusts the bitrate to 10 Gbps and the protocol to Ethernet in step S102*b*. In this example, the RE A 20 performs the adjustments every 3.9-4.1 s. Hence, the REC A 10 changes protocol to CPRI, and will send data over the link since the REC A 10 is the master device, and since the RE A 20 changes protocol to Ethernet, the RE A 20 will start transmitting data at 10 Gbps.

Again, it can be concluded that no match is detected, whereupon the REC A 10 adjusts the bitrate to 25 Gbps while maintaining the CPRI protocol in step S101*d*, but still no match is detected.

Finally in step S101*e*, the REC A10 adjusts the bitrate to 10 Gbps and the protocol type to Ethernet, which indeed matches the bitrate and the protocol for the data transmitted by the RE A 10 over the fronthaul communication link 30 as adjusted by the RE A10 in step S102*b*. As a result, a match is detected by the REC A 10 in step S103 and by the RE A 20 in step S104, and it is now possible for the REC A 10 and the RE A 20 to exchange information over the fronthaul link 30.

In step S105 and S106, respectively, the REC A 10 and the RE A 20 both select the matching bitrate (10 Gbps) and protocol type (Ethernet) for the data transmitted over the fronthaul link 30, and the link is thus adequately configured in that data successfully can be exchanged between the REC A 10 and the RE A 20 over the link 30 using the selected matching bitrate of 10 Gbps and the selected matching communication protocol type being Ethernet.

Thus, when the REC A10 adjusts the bitrate of the data transferred over the link 30 to 10 Gbps and the protocol type to Ethernet in step S101*e*, there is match in that both the REC A 10 and the RE A 20 now is configured to be capable of receiving data over the link 30 at the same bitrate of 10 Gbps using Ethernet, while transmitting data over the link 30 at the same bitrate and with the same communication protocol.

Finally, from the detection performed by the REC A 10 in step S103 (where a corresponding detection thus is performed at the other end of the link 30 by the RE A 20 in step S104), the matching bitrate—i.e. the bitrate supported by both the REC A 10 and the RE A 20—and the protocol type utilized by the two devices are selected as the bitrate and protocol type used for transmitting and receiving data over the established fronthaul communication link 30 in steps S105 and S106.

Advantageously, with the embodiment of FIG. 2, a process is provided where the established fronthaul communication link 30 is adequately configured such that data may be exchanged by the RE A 10 and the REC A 20 over the fronthaul communication link 30.

In the art, for instance when establishing an optical fronthaul link using Ethernet, the REC A 10 and the RE A 20 (and thus the link 30) must be configured before the two devices are connected to each other by the fronthaul communication link 30—for instance during manufacturing. The bitrate and communication protocol is more or less hard-coded into the REC A 10 and the RE A 20 such that the two devices are capable of communicating with each other once being connected to by means of a fronthaul communication link. Such configuration process is highly inefficient, and further cannot be adjusted on-the-fly.

Further it may be envisaged that Forward Error Correction (FEC) methods used by the REC A 10 and RE A 20 must match for the fronthaul link 30 to be correctly configured. For instance, if the REC A 10 applies RS-FEC, then the RE A 20 must also apply RS-FEC. Thus, different FEC method may have to be applied by the two devices throughout steps S101*a*-S101*e* and S102*a*-102*b*, respectively, until a match occurs.

Figure 3:
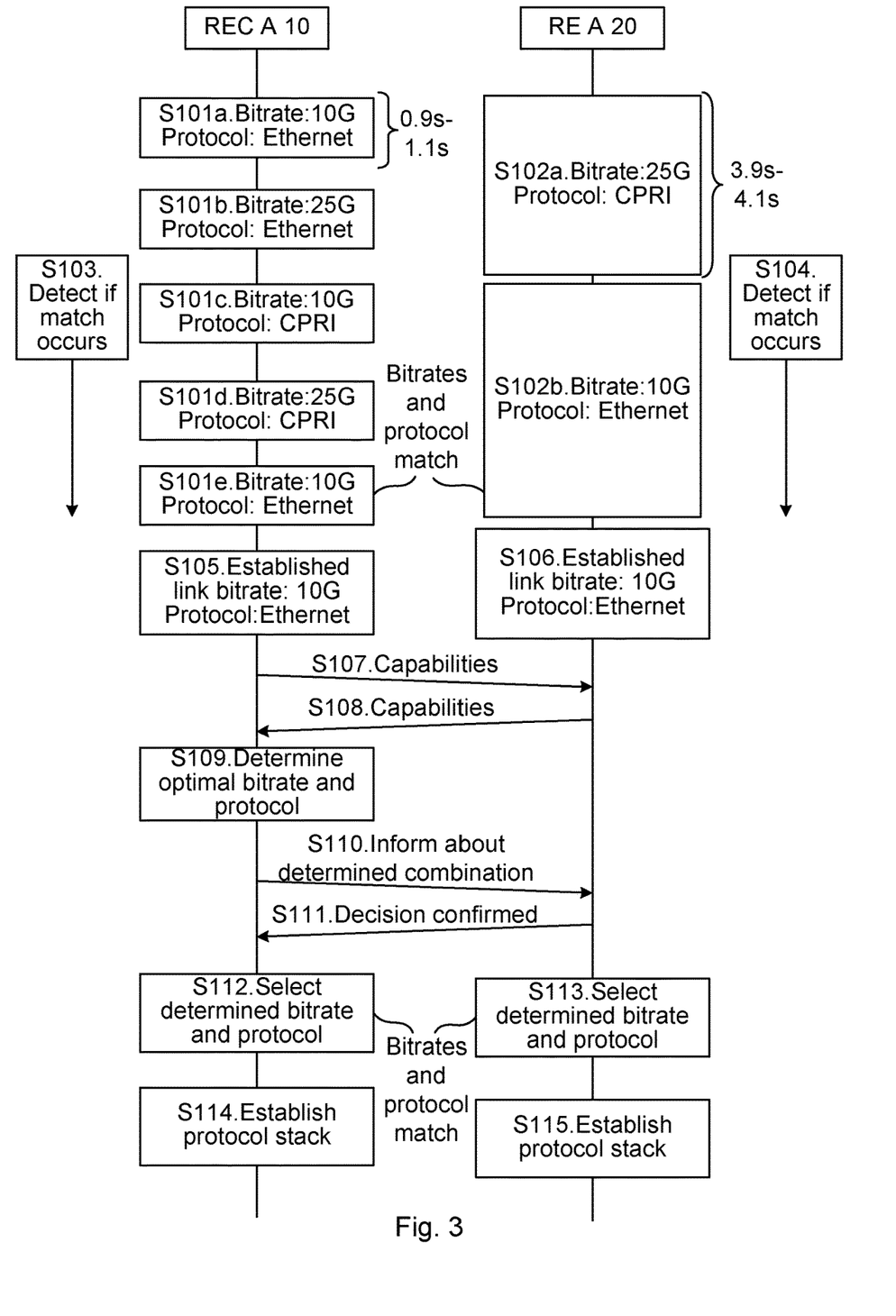
FIG. 3 shows a signalling diagram illustrating a method of configuring the fronthaul communication link connecting the two radio equipment devices of FIG. 1 according to a further embodiment.

In a further embodiment with reference to the signalling diagram of FIG. 3, a confirmation procedure may be undertaken where after having detected that the bitrate and communication protocol for which the REC A 10 is configured to receive data is equal to the bitrate and protocol of the data received from the RE A 20, the REC A 10 informs the RE A 20 in step S107 of the selected (matching) bitrate of 10 Gbps and that the selected protocol is Ethernet may be used when communicating over the fronthaul link 30, and the RE A 20 informs the REC A 10 accordingly in step S108. Optionally, the type of FEC for which there is a match is included in the information exchanged in steps S107 and S108.

The information message of step S107 and the confirmation message of step S108 are typically sent using a protocol that only enables sending of data across the link 30 and not routing the message across other potential links in multiple hops. Such a protocol may be so-called Slow Protocol or Link Layer Discovery Protocol (LLDP) in the Ethernet case.

It may further be envisaged that the REC A 10 sends information to the RE A 20 in step S107 regarding all its capabilities in terms of bitrate and protocol (and FEC type). In this example, the REC A 10 may send information indicating that it is (at least) capable of receiving and transmitting data at both 10 Gbps and 25 Gbps using Ethernet and at both 10 Gbps and 25 Gbps using CPRI.

Correspondingly, the RE A 20 will send information in step S108 indicating that it is (at least) capable of receiving and transmitting data at both 10 Gbps and 25 Gbps using CPRI and at 10 Gbps using Ethernet.

In step S109, if it is envisaged that a number of matching bitrates and protocols are found from the information exchanged in steps S107 and S108 (but which were not tried in previous steps S101a-S104), the REC A 10 determines in step S109 which combination of the numerous matching bitrates and protocols to select for configuring the fronthaul link 30.

For instance, it may be envisaged that 1) a highest matching bitrate is utilized, 2) a highest matching bitrate for a particular protocol, 3) a highest bitrate for a particular matching FEC, or just 4) a preferred protocol type regardless of bitrate, etc. Any matching combination is possible, even though it is likely in practice that a highest possible bitrate is used for communication over the fronthaul link 30.

For instance, in the example of FIGS. 2 and 3, one matching combination is illustrated to be detected at a bitrate of 10 Gbps utilizing Ethernet. However, if further matching combinations were found in the information exchanged in steps S107 and S108, e.g. 25 Gbps while using CPRI, then that combination is typically more preferred for configuration of the fronthaul link 30 than using Ethernet at 10 Gbps.

The selected matching combination of data bitrate-protocol type is communicated to the RE A 20 in step S110, which responds with a confirmation in step S111.

It should be noted that steps S105-S111 may be performed in a different order where the RE A 20 controls the selection of a matching bitrate-protocol combination instead of the REC A 10, and the REC A 10 is hence the more passive of the two.

In step S112, the fronthaul link 30 is configured by REC A using the determined bitrate and communication protocol (and possibly FEC type) for the data communicated over the link 30. If this is the same bitrate as configured in steps S105 and step S106, the fronthaul link 30 remains unchanged.

However, as mentioned, if one or more further matching combinations have been found from the information exchanged in step S107 and S108, where a higher matching bitrate of e.g. 25 Gbps using CPRI has been found, then 25 Gbps will be selected by the REC A 10 in step S112 as the bitrate utilized when communicating data over the link 30 (using CPRI), and the same procedure is performed by the RE A 20 in step S113.

Advantageously, the fronthaul communication link 30 is now configured and operational using the best possible settings given the capabilities of both REC A and RE A 20 as determined by the REC A 10 in step S109.

In steps S114 and S115, the REC A 10 and the RE A 20, respectively, proceeds with communication using the standard protocol stack with transport, network and session protocols, for example transmission control protocol (TCP) and High-Level Data Link Control (HDLC).

If the protocol stack would have been established on the REC A 10 and the RE A 20, respectively, in steps S105 and S106 and any capability information would have been exchanged using the standard protocol stack, the change of bitrate and protocol type—in this example from 10 Gbps Ethernet to 25 Gbps CPRI—would have to be performed with the protocol stack operational. This interruption in traffic may be discovered by many software stacks in the system and be falsely reported as a fault. It would also take more time to establish and then re-establish the protocol stack than to establish it only once. Typically, higher layer protocol stacks are established end-to-end from NMS (Network Management System) to each RE.

Advantageously, with the fronthaul link configuration method according to the described embodiments, it is ensured that preferred link configuration—such as highest possible bitrate for a given protocol such as for instance CPRI or Ethernet—is selected without requiring that each link is explicitly configured by a network operator. This advantageously makes the system easier to configure and upgrade, and may save the operator site visits.

Figure 4:
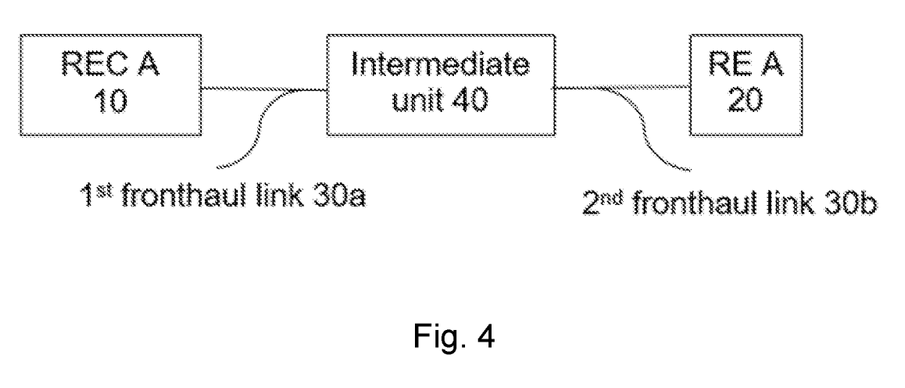
FIG. 4 illustrates the two radio equipment devices establishing communication over a respective fronthaul link with an intermediate unit being connected to the links between the two radio equipment devices according to an embodiment.

FIG. 4 shows the REC A 10 and the RE A 20 being connected to an intermediate unit 40, being for instance a CPRI switch, an Ethernet Switch, or a combined CPRI/Ethernet Switch via a first fronthaul link 30a and a second fronthaul link 30b, respectively.

Figure 5:
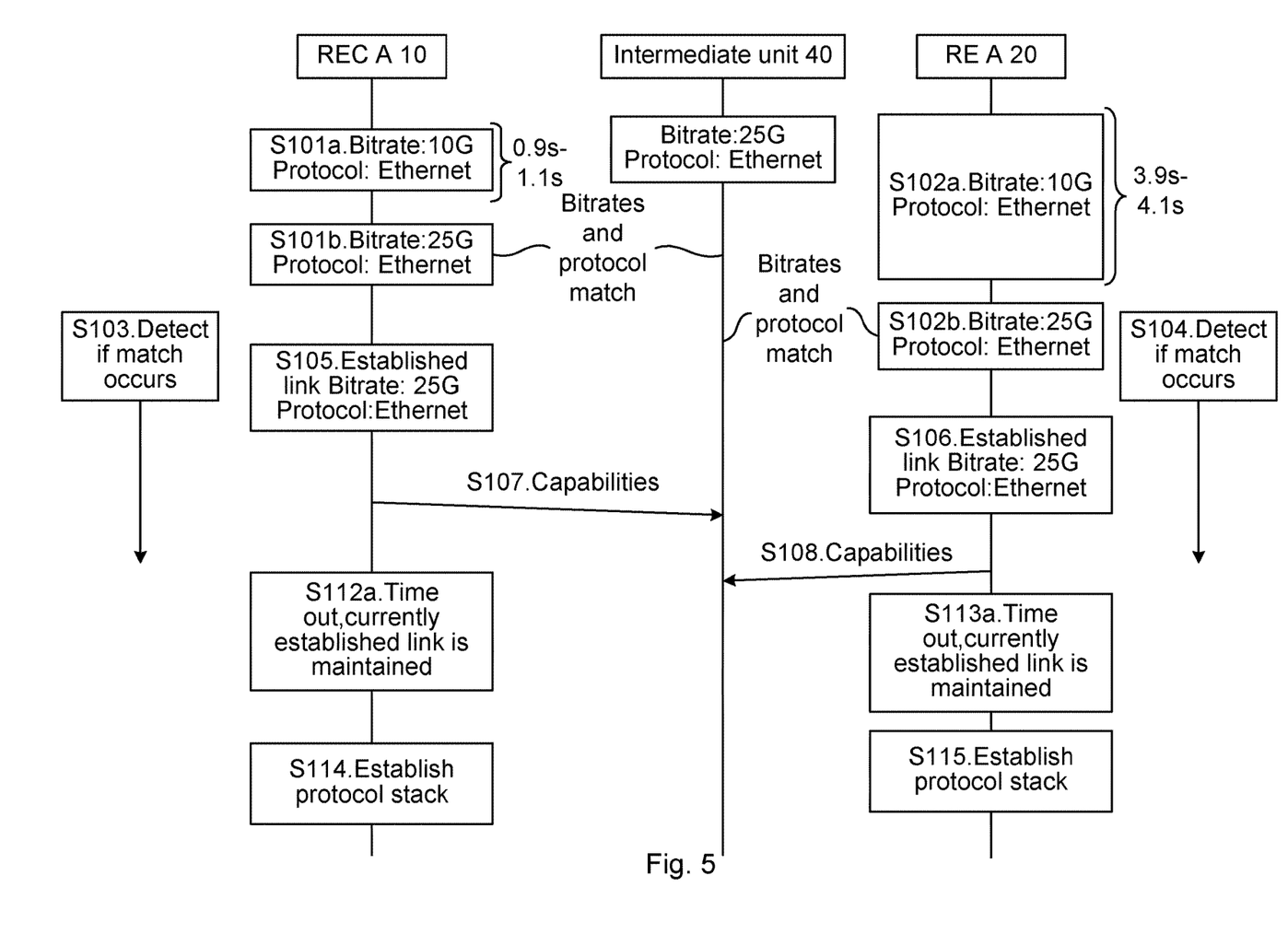
FIG. 5 shows a signalling diagram illustrating a method of configuring the fronthaul communication links connecting the two radio equipment devices of FIG. 4 according to an embodiment.

FIG. 5 shows a signalling diagram illustrating a method of configuring the respective fronthaul communication link 30a and 30b connecting the REC A 10 and the RE A 20 to the intermediate unit 40 according to an embodiment.

The intermediate unit 40 is in this embodiment a radio equipment device which is only capable of transmitting and receiving data at a specific bitrate using a specific communication protocol, in this example the intermediate unit 40 communicates at 25 Gbps using Ethernet.

As in the embodiments of FIGS. 2 and 3, in step S101a, the REC A 10 is configured to be capable of receiving data over the first fronthaul communication link 30a at a selected bitrate, for instance 10 Gbps, and with a selected communication protocol type, such as Ethernet. The REC A 10 will also transmit data over the first link 30a using the selected bitrate and protocol.

For the second fronthaul communication link 30b, the RE A 20 will correspondingly be configured to be capable to receive data in step S102a at a selected bitrate and with a selected communication protocol type and transmit data using the selected parameters. In this example, the RE A 20 transmits the data at a bitrate of 10 Gbps over the second fronthaul communication link 30b using Ethernet.

Now, in line with previous discussions, it is not possible for the REC A 10 and the RE A 20 to exchange data over the first link 30a and the second link 30b, respectively, via the intermediate unit 40 utilizing different data bitrates and/or different communication protocols. If so, it is not possible for one device to correctly interpret the data transmitted by the other, since the bitrate and the protocol type of both REC A 10 and the RE A must be adjusted to match the bitrate and the protocol type used for communication by the intermediate unit 40.

In this particular exemplifying embodiment, after steps S101a and S102a have been performed, there is no match, and the REC A 10 will adjust the bitrate and/or the protocol type for the data it is configured to receive. In this example, only the bitrate of the data communicated over the first fronthaul link 30a is adjusted (to 25 Gbps) in step S101b while still communicating the data over the first link 30a in Ethernet format.

As can be concluded, this is a match for the data communication over the first fronthaul link 30a between the REC A 10 and the intermediate unit 40. Similarly, the RE A 20 finds a match with the intermediate unit 40 correspondingly in step S102b over the second link 30b.

In step S105 and S106, respectively, the REC A 10 and the RE A 20 both select the matching bitrate (25 Gbps) and protocol type (Ethernet) for the data communicated with the intermediate unit 40 over the respective fronthaul link 30a and 30b, and the links are thus adequately configured in that data successfully can be exchanged between the REC A 10 and the RE A 20 via the intermediate unit 40 over the links 30a and 30b using the selected matching bitrate of 25 Gbps and the selected matching communication protocol type being Ethernet.

In line with previous discussions, the REC A 10 informs the intermediate unit 40 in step S107 of the selected (matching) bitrate of 25 Gbps and that the selected protocol is Ethernet when communicating over the fronthaul link 30 using e.g. Slow Protocol or LLDP, and the REC A 10 possibly also informs the intermediate unit 40 about its capabilities in terms of bitrates and protocol types.

However, since the intermediate unit 40 is not capable of communicating according to embodiments described herein, the intermediate unit 40 cannot respond with informing the REC A 10 (as was previously performed by the RE A 20 in step S108).

The REC A 10 will conclude in step S112a that a set response timer performs a time-out and that the configuration performed in step S105 for the first fronthaul link 30a is to be maintained. Correspondingly, the RE A 20 will conclude in step S113a that a capabilities message was not received in reply to the information sent in step S108 and that a set request timer accordingly performs a time-out, and that the configuration performed in step S106 for the second fronthaul link 30b is to be maintained.

Finally, the REC A 10 and the RE A 20 proceed with establishing their protocol stacks in step S114 and S115, respectively, as previously described.

Advantageously, with this embodiment, the fronthaul communication links 30a and 30b are configured even though an intermediate unit 40 not supporting the configuration process of adjusting bitrate and/or protocol type is connected to the first link 30a and the second link 30b.

Figure 6:
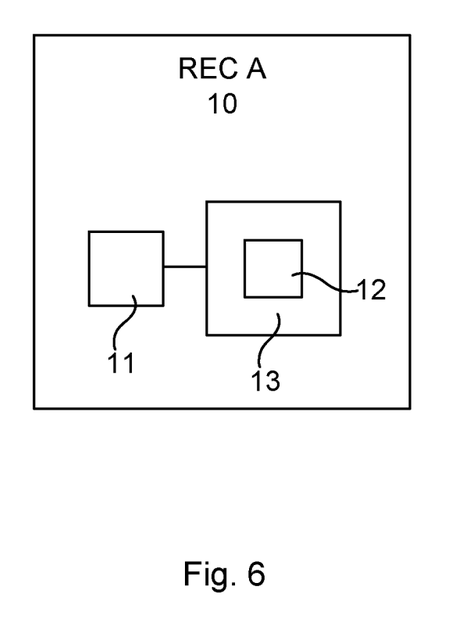
FIG. 6 illustrates a radio equipment device according to an embodiment.

FIG. 6 illustrates a radio equipment device, in this exemplifying embodiment the REC A 10, arranged to configure a fronthaul communication link established with another radio equipment device according to an embodiment. The steps of the method performed by the REC A 10 are in practice performed by a processing unit 11 embodied in the form of one or more microprocessors arranged to execute a computer program 12 downloaded to a suitable storage volatile medium 13 associated with the microprocessor, such as a Random Access Memory (RAM), or a non-volatile storage medium such as a Flash memory or a hard disk drive. The processing unit 11 is arranged to cause the REC A 10 to carry out the method according to embodiments when the appropriate computer program 12 comprising computer-executable instructions is downloaded to the storage medium 13 and executed by the processing unit 11. The storage medium 13 may also be a computer program product comprising the computer program 12. Alternatively, the computer program 12 may be transferred to the storage medium 13 by means of a suitable computer program product, such as a Digital Versatile Disc (DVD) or a memory stick. As a further alternative, the computer program 12 may be downloaded to the storage medium 13 over a network. The processing unit 11 may alternatively be embodied in the form of a digital signal processor (DSP), an application specific integrated circuit (ASIC), a field-programmable gate array (FPGA), a complex programmable logic device (CPLD), etc The aspects of the present disclosure have mainly been described above with reference to a few embodiments and examples thereof. However, as is readily appreciated by a person skilled in the art, other embodiments than the ones disclosed above are equally possible within the scope of the invention, as defined by the appended patent claims.

Thus, while various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

The invention claimed is:

1. A method for configuring a fronthaul communication link between a first radio equipment (RE) device and a second RE device, comprising:

configuring the first RE device to receive data transmitted over the fronthaul communication link at a first selected bitrate using a first selected communication protocol;

for a first period of time during which the first RE device is configured to receive data over the fronthaul communication link at the first selected bitrate using the first selected communication protocol, monitoring the fronthaul communication link to determine whether the second RE device has transmitted data over the fronthaul communication link at the first selected bitrate using the first selected communication protocol;

as a result of determining that, at no point during the first period of time, the second device transmitted data over the fronthaul communication channel at the first selected bitrate using the first selected communication protocol, configuring the first RE device to receive data over the fronthaul communication link at a second selected bitrate using a second selected communication protocol, wherein the second selected bitrate is different from the first selected bitrate and/or the second selected communication protocol is different from the first selected communication protocol;

for a second period of time during which the first RE device is configured to receive data over the fronthaul communication link at the second selected bitrate using the second selected communication protocol, monitoring the fronthaul communication link to determine whether the second RE device has transmitted data over the fronthaul communication link at the second selected bitrate using the second selected communication protocol; and as a result of determining that, during the second period of time, the second RE device transmitted data over the fronthaul communication link at the second selected bitrate using the second selected communication protocol, selecting the second selected bitrate and second selected communication protocol for communications with the second RE device over the fronthaul communication link.

2. The method of claim 1, wherein configuring the first RE device to receive data transmitted over the fronthaul communication link at the first selected bitrate using the first selected communication protocol comprises:

transmitting data at the first selected bitrate with the first selected communication protocol over the fronthaul communication link.

3. The method of claim 1, wherein configuring the first RE device to receive data transmitted over the fronthaul communication link at the first selected bitrate using the first selected communication protocol comprises selecting a type of Forward Error Correction, FEC, applied when receiving data over the fronthaul communication link, and monitoring the fronthaul communication link to determine whether the second RE device has transmitted data over the fronthaul communication link at the first selected bitrate using the first selected communication protocol comprises determining whether the second RE device has transmitted data over the fronthaul communication link with the selected type of FEC.

4. The method of claim 1, further comprising:
transmitting, over the fronthaul communication link, information indicating one or more combinations of bitrate, communication protocol, and FEC type at which the first RE device is capable of receiving and transmitting data over the fronthaul communication link.

5. The method of claim 4, further comprising:
receiving, over the fronthaul communication link, information indicating one or more combinations of bitrate, communication protocol, and FEC type at which the second RE device is capable of receiving and transmitting data over the fronthaul communication link.

6. A non-transitory computer readable storage medium storing a computer program comprising computer-executable instructions for causing a device to perform the method of claim 1 when the computer-executable instructions are executed on a processing unit included in the device.

7. A first radio equipment (RE) device, the first RE device comprising a processing circuitry and a memory, said memory containing instructions executable by said processing circuity, whereby the first RE device is operative to:
configure the first RE device to receive data transmitted over a fronthaul communication link at a first selected bitrate using a first selected communication protocol;
for a first period of time during which the first RE device is configured to receive data over the fronthaul communication link at the first selected bitrate using the first selected communication protocol, monitor the fronthaul communication link to determine whether a second RE device has transmitted data over the fronthaul communication link at the first selected bitrate using the first selected communication protocol;
as a result of determining that, at no point during the first period of time, the second device transmitted data over the fronthaul communication channel at the first selected bitrate using the first selected communication protocol, configure the first RE device to receive data over the fronthaul communication link at a second selected bitrate using a second selected communication protocol, wherein the second selected bitrate is different from the first selected bitrate and/or the second selected communication protocol is different from the first selected communication protocol;
for a second period of time during which the first RE device is configured to receive data over the fronthaul communication link at the second selected bitrate using the second selected communication protocol, monitor the fronthaul communication link to determine whether the second RE device has transmitted data over the fronthaul communication link at the second selected bitrate using the second selected communication protocol; and
as a result of determining that, during the second period of time, the second RE device transmitted data over the fronthaul communication link at the second selected bitrate using the second selected communication protocol, select the second bitrate and the second communication protocol for communications with the second RE device over the fronthaul communication link.

8. The first RE device of claim 7, wherein to configure the first RE device to receive data transmitted over the fronthaul communication link at the first selected bitrate using the first selected communication protocol comprises to:
transmit data at the first selected bitrate with the first selected communication protocol over the fronthaul communication link.

9. The first RE device of claim 7, wherein
to configure the first RE device to receive data transmitted over the fronthaul communication link at the first selected bitrate using the first selected communication protocol comprises to select a type of Forward Error Correction, FEC, applied when receiving data over the fronthaul communication link, and
to monitor the fronthaul communication link to determine whether the second RE device has transmitted data over the fronthaul communication link at the first selected bitrate using the first selected communication protocol comprises to determine whether the second RE device has transmitted data over the fronthaul communication link with the selected type of FEC.

10. The first RE device of claim 7, further being operative to:
transmit, over the fronthaul communication link, information indicating one or more combinations of bitrate, communication protocol, and FEC type at which the first RE device is capable of receiving and transmitting data over the fronthaul communication link.

11. The first RE device of claim 10, further being operative to:
receive, over the fronthaul communication link, information indicating one or more combinations of bitrate, communication protocol, and FEC type at which the second RE device is capable of receiving and transmitting data over the fronthaul communication link.

12. The first RE device of claim 10, further being operative to:
for a third period of time after transmitting the information indicating the one or more combinations, monitor the fronthaul communication link to determine whether the second RE device has transmitted a confirmation message over the fronthaul communication link; and
as a result of determining that, during the third period of time, the second RE device has not transmitted the confirmation message over the fronthaul communication link, maintain communications with the second RE device using the second bitrate and the second communication protocol over the fronthaul communication link.

13. The first device of claim 11, further being operative to:
determine a plurality of matching combinations based on the received one or more combinations; and
select a preferred combination for the first RE device and the second RE device from the plurality of matching combinations.

14. The first RE device of claim 13, wherein the preferred combination is the matching combination indicating the highest bitrate.

15. The first RE device of claim 13, further being operative to:
transmit, over the fronthaul communication link, information indicating the selected matching combination.

16. The first RE device of claim 15, further being operative to:
receive, over the fronthaul communication link, a confirmation indicating that the selected matching combination is agreed upon by the second RE device.

17. The first RE device of claim 16, further being operative to:
select a bitrate and a communication protocol vindicated by the matching combination as the bitrate and communication protocol or communications with the second RE device over the fronthaul communication link.

18. The first RE device of claim 17, further being operative to:
establish a protocol stack for communication over the fronthaul communication link.

* * * * *